US009734368B1

(12) United States Patent
Kantor et al.

(10) Patent No.: US 9,734,368 B1
(45) Date of Patent: Aug. 15, 2017

(54) DETERMINING A LOCATION BASED ON RADIO FREQUENCY IDENTIFICATION (RFID) READ EVENTS

(71) Applicant: Amazon Technologies, Inc., Seattle, WA (US)

(72) Inventors: Oleg Kantor, Kirkland, WA (US); Tak Keung Joseph Lui, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/185,933

(22) Filed: Jun. 17, 2016

(51) Int. Cl.
  *G08B 13/14* (2006.01)
  *G06K 7/10* (2006.01)
  *G01S 1/02* (2010.01)

(52) U.S. Cl.
  CPC ............ *G06K 7/10366* (2013.01); *G01S 1/02* (2013.01); *G06K 7/10356* (2013.01)

(58) Field of Classification Search
  CPC ........... G06K 7/10366; G06K 7/10356; G06K 7/0008; G06K 17/0029; G01S 1/02
  USPC ..................................................... 340/572.1
  See application file for complete search history.

(56) References Cited

U.S. PATENT DOCUMENTS

| 7,614,555 | B2 * | 11/2009 | Sullivan | G06K 7/0008 340/572.1 |
| 7,817,014 | B2 * | 10/2010 | Krishna | G06K 7/10356 340/10.2 |
| 9,443,218 | B2 * | 9/2016 | Stiefel | G06K 7/10366 |
| 2009/0315678 | A1 * | 12/2009 | Padmanabhan | H04Q 9/00 340/10.1 |
| 2016/0224814 | A1 * | 8/2016 | Stiefel | G06K 7/10366 |

* cited by examiner

*Primary Examiner* — John A Tweel, Jr.
(74) *Attorney, Agent, or Firm* — Kilpatrick Townsend & Stockton LLP

(57) ABSTRACT

Techniques for determining an item location based on multiple RFID parameters from multiple read events are described. In an example, a computer system may access a first read event. A first RFID reader located within a first zone may have generated the first read event at a first time. The first read event may identify an RFID tag and may include first RFID parameters. The computer system may access a second read event. A second RFID reader located within a second zone may have generated the second read event at a second time within a predefined amount of time from the first time. The second read event may identify the RFID tag and include second RFID parameters. The computer system may determine whether the item location falls within the first zone or the second zone based on two or more first RFID parameters and two or more second RFID parameters.

20 Claims, 7 Drawing Sheets

DETERMINING A LOCATION BASED ON RADIO FREQUENCY IDENTIFICATION (RFID) READ EVENTS

BACKGROUND

Radio frequency identification (RFID) technology has been adopted in many industries for different applications. For example, RFID is deployed to track locations of items in an operational environment. In particular, an RFID tag is attached to an item. An RFID reader is operated to read the RFID tag. Based on reading the RFID tag, a determination is made that the item is located in proximity to the RFID reader.

In many operational environments, the RFID tag of the item may be read by multiple RFID readers within a certain period of time. In a way, the RFID readers cross-read the RFID tag at substantially the same time. Hence, processing the different reads of the different RFID readers may be performed to determine which of the RFID readers is closest to the item and, accordingly, complete the proximity detection.

Generally, processing the cross-reads to detect proximity involves determining the maximum received signal strength. For example, a particular RFID reader measuring the largest received signal strength indicator (RSSI) is selected as being the closest to the item. However, such a proximity detection may be inaccurate. For example, radio frequency (RF) reflections and obstructions from objects and orientation of the RFID tag relative to the RFID readers may result in the largest RSSI, whereas the particular RFID reader may not be the closest reader to the item.

BRIEF DESCRIPTION OF THE DRAWINGS

Various embodiments in accordance with the present disclosure will be described with reference to the drawings, in which.

DETAILED DESCRIPTION

Figure 1:
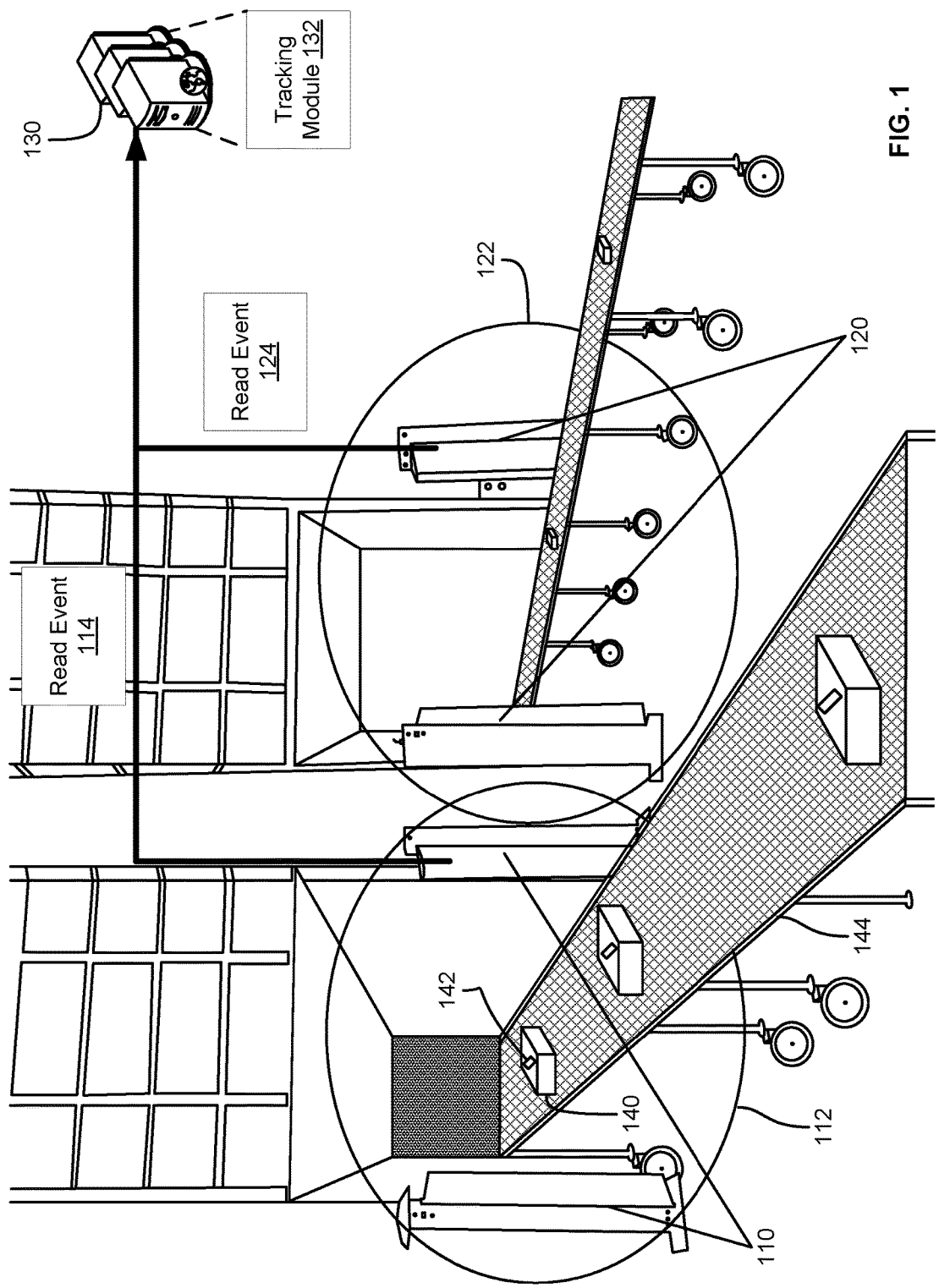
FIG. 1 illustrates an example operational environment for tracking items, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to improving accuracy of detecting proximity between an item and an RFID reader. The proximity may indicate how close a location of the item may be relative to a location of the RFID reader, or vice versa. In an example, an RFID tag may be attached to the item and may store information about the item. During a read cycle, the RFID reader may transmit a number of RF interrogation signals and receive a number of RF responses thereto from the RFID tag. A read event may be generated from the RF interrogation and response. For example, the read event may identify the item from the information stored in the RF tag and may include multiple RFID parameters measured during the reading cycle (generally referred to herein as "parameters"). These parameters (e.g., RFID parameters) may include a count of how many times the RFID tag was read (e.g., the number of RF responses), an average received signal strength, the maximum received signal strength, time stamps of the RF response signals, electrical angle, and/or other RF-related parameters.

A back-end system may receive RF read events from multiple RFID readers. Some of the read events may identify the same item and may have been generated within a predefined period of time (e.g., a short period of time relative to movement of the item or during overlapping read cycles). The back-end system may analyze these read events to determine which of the applicable RFID readers is in closest proximity to the item. Generally, to mitigate the risk of cross-reads, the analysis may involve multiple parameters (e.g., at least two) from each of the read events. Because multiple parameters may be analyzed, the accuracy of the proximity detection may be improved.

To illustrate, consider an example of an item labeled with an RFID tag and placed on a conveyor belt. The conveyor belt may move the item within a sortation facility, through an exit door, and onto a delivery vehicle. An RFID reader may be located at the exit door to track and ensure that the item is destined to the correct delivery vehicle. The RFID reader may cover a zone around the exit door. The RFID tag may be read when the item moves within the zone. In this illustrative example, another RFID reader may also be located at an adjacent exit door and may cover an area around the adjacent exit door. Because the two RFID readers are adjacent to each other and because of a number of other factors (e.g., overlap between the two zones, RF reflection, RF obstruction, relative orientation of the RFID tag to the two RFID readers), both RFID readers may simultaneously, or nearly simultaneously, read the RFID tag as the item leaves the sortation facility through the first exit door. Hence, there may be a risk of inaccurately tracking the location of the item to the adjacent exit door. To mitigate this risk and improve the accuracy, a back-end system may analyze relevant read events of the two RFID readers. For example, parameters from a first read event of the first RFID reader may be normalized based at least on parameters from a second read event of the adjacent RFID reader, and vice versa, to generate scores for each of the two read events. The back-end system may compare the scores to identify which of the two zones may contain the item. For instance, the count of how many times the RFID tag was read, the average signal strength, and the maximum signal strength from the first read event may be normalized using the total count, the total average signal strength, and the total maximum signal strength across the two read events. These normalized parameters are summed to generate the score for the first read event. A similar process may be used to generate the score for the second read event. The back-end system may determine that the item may be located within the zone corresponding to the RFID reader that earns the highest score.

In the interest of clarity of explanation, various embodiments of the present disclosure are described in connection with an illustrative example of an RFID tag read by two RFID readers, where the RFID tag may be attached to a movable item and where the RFID readers may be stationary. However, the embodiments are not limited as such. For example, the embodiments may similarly apply to a larger number of RFID readers. In this case, a back-end system may analyze relevant read events generated by these RFID readers. In another example, the item may be stationary and the RFID readers may be movable. In this example, a determination may be made as to which of the RFID readers is most proximate to the stationary location of the item. In yet another example, a single RFID reader may read multiple RFID tags attached to respective items. In this example, a determination may be made as to which of the items is most proximate to the RFID reader. Each of the read events may correspond to a read by the RFID reader of a respective RFID tag.

FIG. 1 illustrates an example operational environment for tracking items. Generally, the operational environment may include a number of RFID readers in communication with a back-end system. Each RFID reader may be located within a known location of the operational environment and cover a zone around the known location. An RFID tag may be attached to an item. The item may be moved between zones covered by the RFID readers. Generally, as the item arrives into and moves within a zone, an RFID reader covering the zone may read the RFID tag during various read cycles. Once the item leaves the zone, the RFID reader may no longer read the RFID tag. In certain situations, however, the RFID reader may read the RFID tag even when the item is outside the zone and/or another RFID reader(s) may read the RFID tag as the item progresses through the zone. To mitigate the risk of inaccurately tracking the item, the back-end system may analyze multiple read events that identify the item.

FIG. 1 illustrates two example RFID readers, shown as RFID reader 110 and RFID reader 120. The RFID reader 110 may be located at an exit door of a sortation facility to cover a zone 112 around the exit door. Hence, an item 140 going through the zone 112 may be detected. For example, an RFID tag 142 may be attached to the item 140. The item 140 may be placed on a conveyor belt 144 going through the exit door. As the item progresses through the zone 112, the RFID reader 110 may read the RFID tag 142 during a read cycle. Accordingly, the RFID reader 110 may generate and send a read event 114 to the back-end system 130.

Similarly, the RFID reader 120 may be located at an adjacent exit door to cover an adjacent zone 122. There may be an overlap between the two zones 112 and 122. The RFID reader 120 may generate and send read events for items progressing through the zone 122 to the back-end system 130. However, in certain situations, the RFID reader 120 may also cross-read the RFID tag 142 while the item 140 is on the conveyor belt 144 and is progressing through the other zone 112. For example, the item 140 may be too close or within the overlap between the two zones 112 and 122. Additionally or alternatively, various reasons may cause this read effect including, for instance, RF reflection from other objects in the operational environment and/or relative orientation of the RFID tag 142 to RFID reader 120. Accordingly, the RFID reader 120 may generate and send, to the back-end system 130, a read event 124 corresponding to the reading of the RFID tag 142 during the read cycle of the RFID reader 120.

The back-end system 130 may receive and analyze the read event 114 and the read event 124 to track the item as being located within the zone 112 and not the zone 122. The analysis may use multiple parameters from each of the read events as further described in the next figures. Generally, the analysis may involve a normalization of certain parameters.

In an example, the back-end system 130 may be a server or any other computing system suitable for receiving read events from RFID readers over a wireless or wired communication network. For instance, the back-end system 130 may include computing hardware or a virtual instance running on computing hardware (e.g., a cloud-based computing service). In addition, the back-end system 130 may be configured to host a tracking module 132.

The tracking module 132 may be configured to analyze read events and accordingly track item locations. The tracking may be in real time or substantially real time. Real time may be defined as a predefined timeframe relative to the timing of the read events, where the tracking may be considered up to date and not stale if processed within the predefined timeframe. For example, the predefined timeframe may be set as five minutes, as a function of the processing time needed to perform the tracking analysis, or as a function of an RFID reader's read cycle (e.g., the tracking may be in real time if the read event corresponds to the last read cycle and no new read events have been generated by the RFID reader). In an example, upon the back-end system 130 receiving the first read event 114 and the second read event 124, the tracking module 132 may determine that the two read events identify the same item 140. Next, the tracking module 132 may determine that the two read events may have been generated around the same time (e.g., there is some time overlap or being generated within a threshold amount of time of each other). Accordingly, the tracking module 132 may further analyze at least two parameters from the first read event 114 and at least two parameters from the second read event 124 and determine that the item 140 may be located within the first zone 112 and not the second zone 114.

In addition, tracking item locations may include providing or reporting location information to client devices. For instance, a client device may be subscribed to a tracking service of the tracking module 132. The tracking module 132 may push or, upon request, transmit the location information to the client device. Further, the tracking module 132 may drive a user interface of the client device. The location information may be presented at the user interface. For instance, the user interface may also allow a user to browse location information per item or per RFID reader. Hence, the user interface may present the current location and/or location history of the item 140 as the item 140 progresses through the sortation facility. The user interface may also present a list of items detected as having progressed or currently progressing through the zone 112 of the RFID reader 110 and the related timing information. In addition, the user interface may present a map of the sortation facility. The map may show the locations of the RFID readers, identify items, and present the detected item locations.

Figure 2:
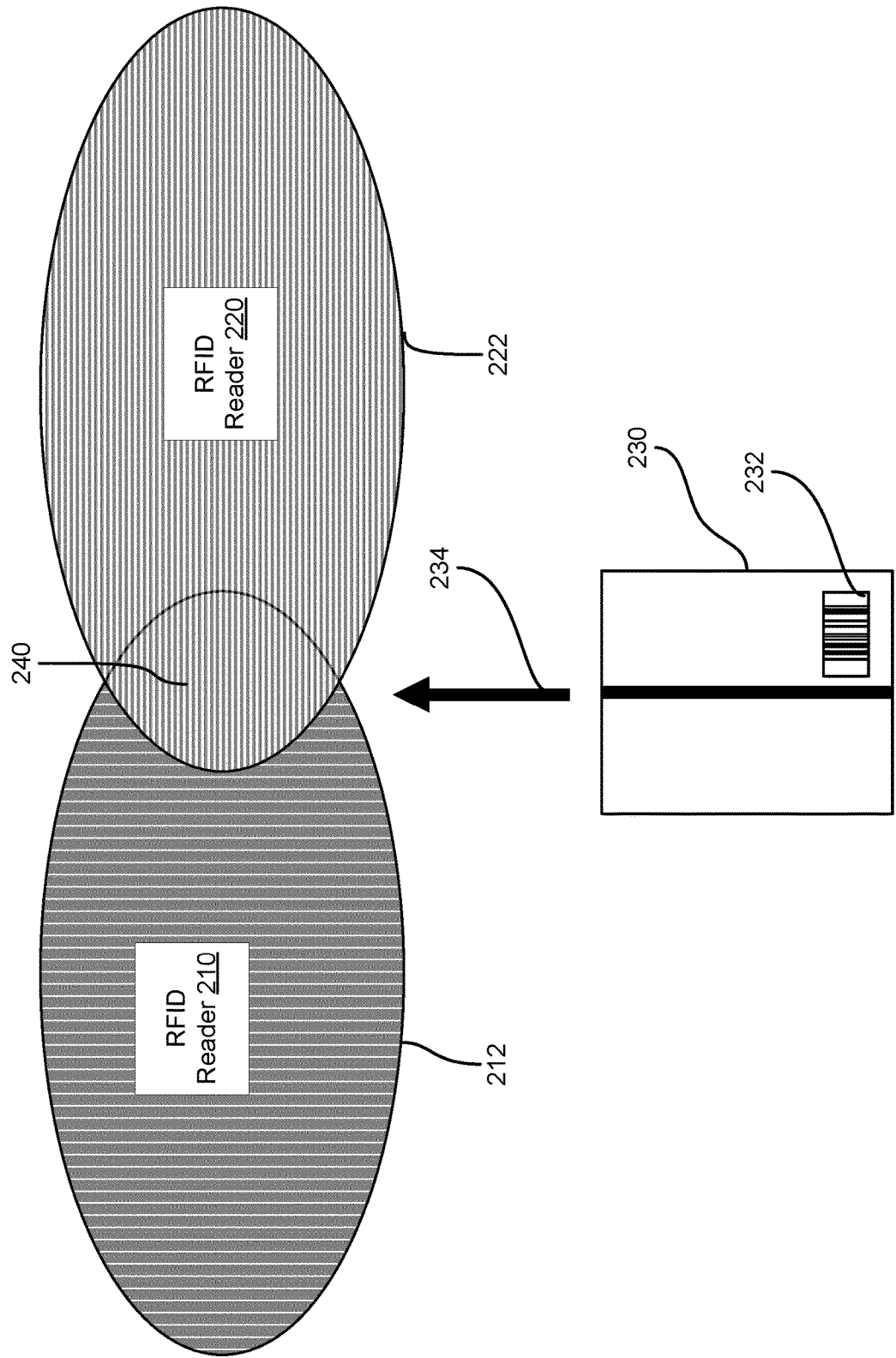
FIG. 2 illustrates an example of two RFID readers reading an RFID tag attached to an item, according to an embodiment of the present disclosure.

FIG. 2 illustrates an example of two RFID readers 210 and 220 reading an RFID tag 232 attached to an item 230.

The RFID readers 210 and 220 may cover zones 212 and 222, respectively. As the item 230 moves, the item 230 may progress through one of the two zones 212 and 222 or through an overlap 240 between the two zones 212 and 222. During a read cycle of the RFID reader 210, the RFID reader 210 may read the RFID tag 232 depending on the location of the item 230 relative to the zone 212 (or, equivalently, relative to the location of the RFID reader 210) and various factors (e.g., orientation of the RFID tag 232, RF reflection, RF propagation, etc.). If the RFID tag 232 is read, the RFID reader 210 may generate a read event. The read event may include information about the item 230 and RF-related parameters. Similarly, the RFID reader 220 may read the RFID tag 232 during a read cycle of the RFID reader 220 and may generate a read event. This read event may correspond to a cross-read of the RFID tag 232.

In an example, the read cycles of the RFID readers 210 and 220 need not be the same. Each read cycle may involve a number of transmitted RF signals and a number of RF responses thereto (e.g., an RF signal reflected back and received based on a transmitted RF signal). Hence, within a read cycle, the RFID tag 232 may be read a number of times. In addition, the timing of the read cycles need not be synchronized for the two RFID readers 210 and 220.

A zone (e.g., each of the zones 212 and 222) may represent a volume of space within which an RFID tag may be read. The volume may be defined by the intensity and frequency of transmitted RF signals, objects in the operational environment, specific geometry and properties of the operational environment, and other RF-related factors. Generally, the RFID reader may be located within the volume (e.g., at about the center). FIG. 2 illustrates ellipsoidal zones, but other shapes may be possible.

In an example, the RFID tag 232 may be adhesively attached to the item 230 or to a container containing the item 230. In an example, the RFID tag 232 may be a passive RFID tag or an active RFID tag. Regardless of the tag type, the RFID tag 232 may store information about the item 230. The information may identify the item 230. For instance, a unique identifier such as an electronic product code (EPC), a universal product code (UPC), or some other serial number unique to the item 230 may be encoded in the RFID tag 232 according to an encoding standard, such as global standards one (GS1). The information may also provide additional information regarding the origin, destination, and/or handling of the item 230.

A read event may include any of the information about the item 230 (e.g., the identifying information). In addition, the read event may include information about the RFID reader that generated the read event. This information may include, for instance, a unique identifier and, optionally, a location of the RFID reader. Further, the read event may include measured RF-related parameters such as the count of times the RFID tag 232 may have been read during the relevant read cycle, the average RSSI, the maximum RSSI, and time stamps of the RF responses.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal, but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electromagnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF), or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader is received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes, or the like), or other like materials. The protective layer may be adhered to one or more capacitive elements of an RFID circuit, which may include elements formed from a conductive material such as aluminum, copper, silicon, or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer, is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers, or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved), but also a stylus, a pointer or another like object.

Figure 3:
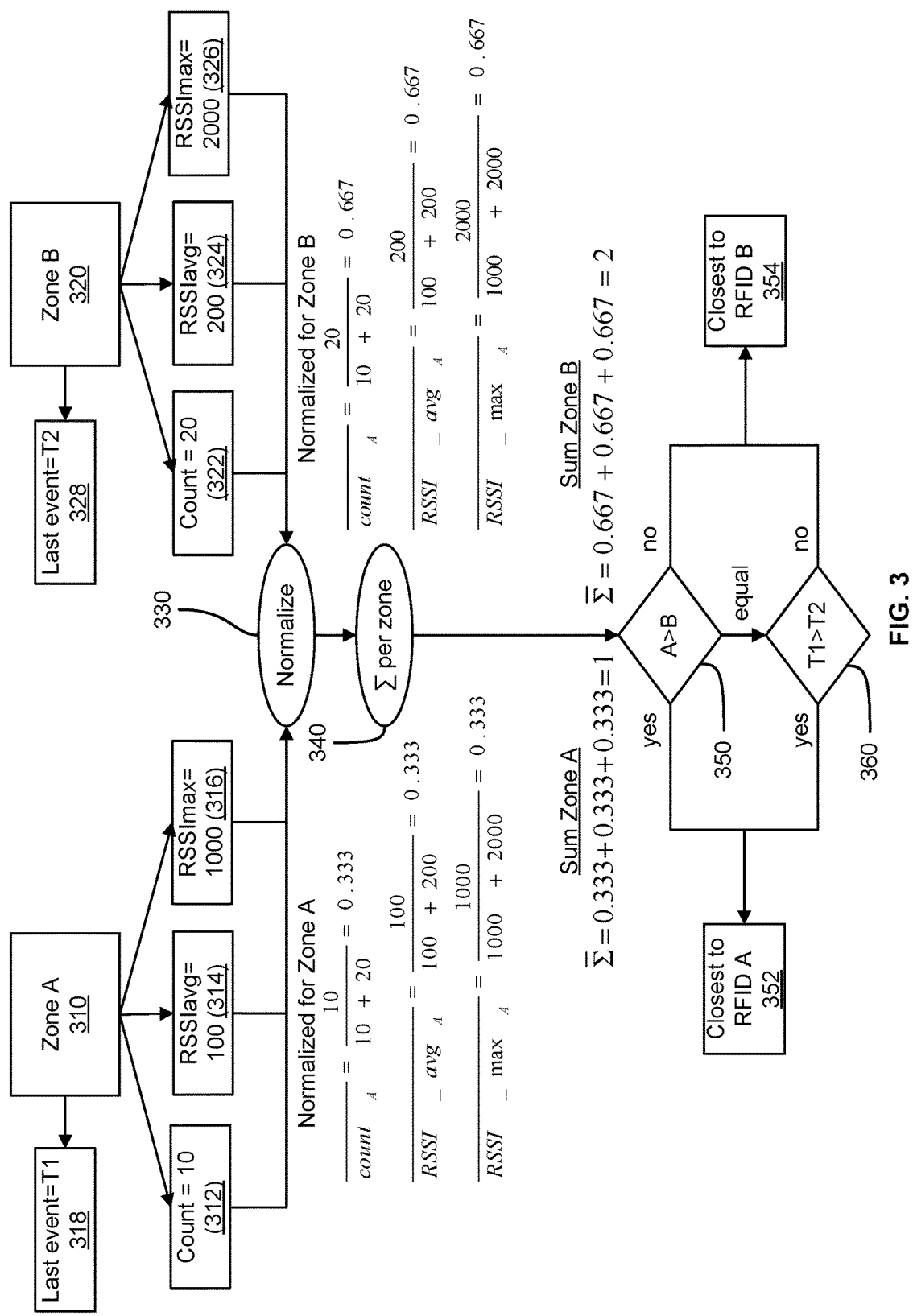
FIG. 3 illustrates an example block diagram for processing read events of multiple RFID readers to determine whether an item may be located within a zone associated with one of the RFID readers, according to an embodiment of the present disclosure.

FIG. 3 illustrates an example block diagram for processing read events of multiple RFID readers to determine whether an item may be located within a zone associated with one of the RFID readers. In this illustrative example, multiple parameters across multiple read events are analyzed to mitigate the risk of cross-read and more accurately determine the location of the item. Generally, the processing may involve normalizing the parameters across the read events, generating scores for the read events from the normalization, and comparing the scores.

In the particular illustrative example of FIG. 3, two read events, each having four parameters, may be analyzed. A first RFID reader may be associated with a first zone 310, may read an RFID tag during a read cycle, and may generate a first read event. Similarly, a second RFID reader may be associated with a second zone 320, may read the RFID tag during a read cycle, and may generate a second read event. The two read events may be generated within a short period of time of each other. For instance, the two read cycles may overlap entirely or partially in time. Each of the read events may include measured values for four parameters: count of times, average signal strength (e.g., RSSI), maximum signal strength, and time stamps. In particular, two read events are generated by two RFID readers, respectively.

In this illustration, the first read event may include a first count 312 (shown with a value of ten), a first average RSSI 314 (shown with a value of one hundred), a first maximum RSSI 316 (shown with a value of one thousand), and a first last time stamp 318 (shown with a value T1). The last time stamp 318 may correspond to the last received RF signal during the read cycle. Similarly, the second event may include a second count 322 (shown with a value of twenty), a second average RSSI 324 (shown with a value of two hundred), a second maximum RSSI 326 (shown with a value of two thousand), and a second last time stamp 328 (shown with a value T2).

The analysis of the two read events may include a normalization of some of the parameters. For example, a total count may be generated by adding the first count 312 and the second count 322. The first count 312 may be normalized by dividing the first count 312 by the total count, resulting in a first normalized count (shown with a value of 0.333). A similar normalization may be performed for the second count 322 to generate a normalized second count (shown with a value of 0.667). This normalization may also be performed for the average RSSIs and the maximum RSSIs resulting in a first normalized RSSI (shown with a value of 0.333) and a first normalized maximum RSSI (show with a value of 0.333) for the first read event, and a second normalized RSSI (shown with a value of 0.667) and a second normalized maximum RSSI (shown with a value of 0.667) for the second read event.

Next, the analysis may include generating a score per read event based on the respective normalized parameters. For example, normalized parameters corresponding to a zone (or, equivalently, to a RFID reader) may be summed 340. Hence, a first score for the first event may be generated by adding the first normalized count, the first normalized average RSSI, and the first normalized maximum RSSI (the first score is shown with a value of one). Similarly, a second score for the second event may be generated by adding the second normalized count, the second normalized average RSSI, and the second normalized maximum RSSI (the second score is shown with a value of two).

Further, the analysis may compare the scores of the read events. Depending on the results of the comparison, a determination may be made as to which of the RFID readers is closest to the item. Continuing with the previous example, a comparison 350 of the first score and the second score may indicate that the second score is larger. Accordingly, the item may be identified as progressing through the second zone 320 and thereby the second RFID reader is the closest 354. On the other hand, if the comparison 350 may have resulted in the opposite indication, the first RFID reader may be determined as being the closest 352.

In certain situations, the scores may fall within a threshold amount of each other. For example, the scores may be equal or may be too close (e.g., deviating within a predefined margin of plus or minus five percent, or some other predefined deviation). In such situations, the analysis may further involve other parameters from the read events. These parameters may include time stamps. For example, the first last time stamp 318 and the second last time stamp 328 may be compared 360 to determine a timing order between the two. If the first last time stamp 318 is the latest of the two, the first RFID reader may be determined as being the closest 352. Otherwise, the second RFID reader may be determined as being the closest 354.

The above analysis is provided for illustrative purposes. Generally, at least two parameters per read event may be analyzed. Likewise, other statistical analysis (e.g., beyond normalization and comparison) may also be used. In addition, the analysis may be repeated for more than two read events and/or for more than two RFID readers, when such events fall within a predefined period of time from each other (e.g., by overlapping partially or fully).

Figure 4:
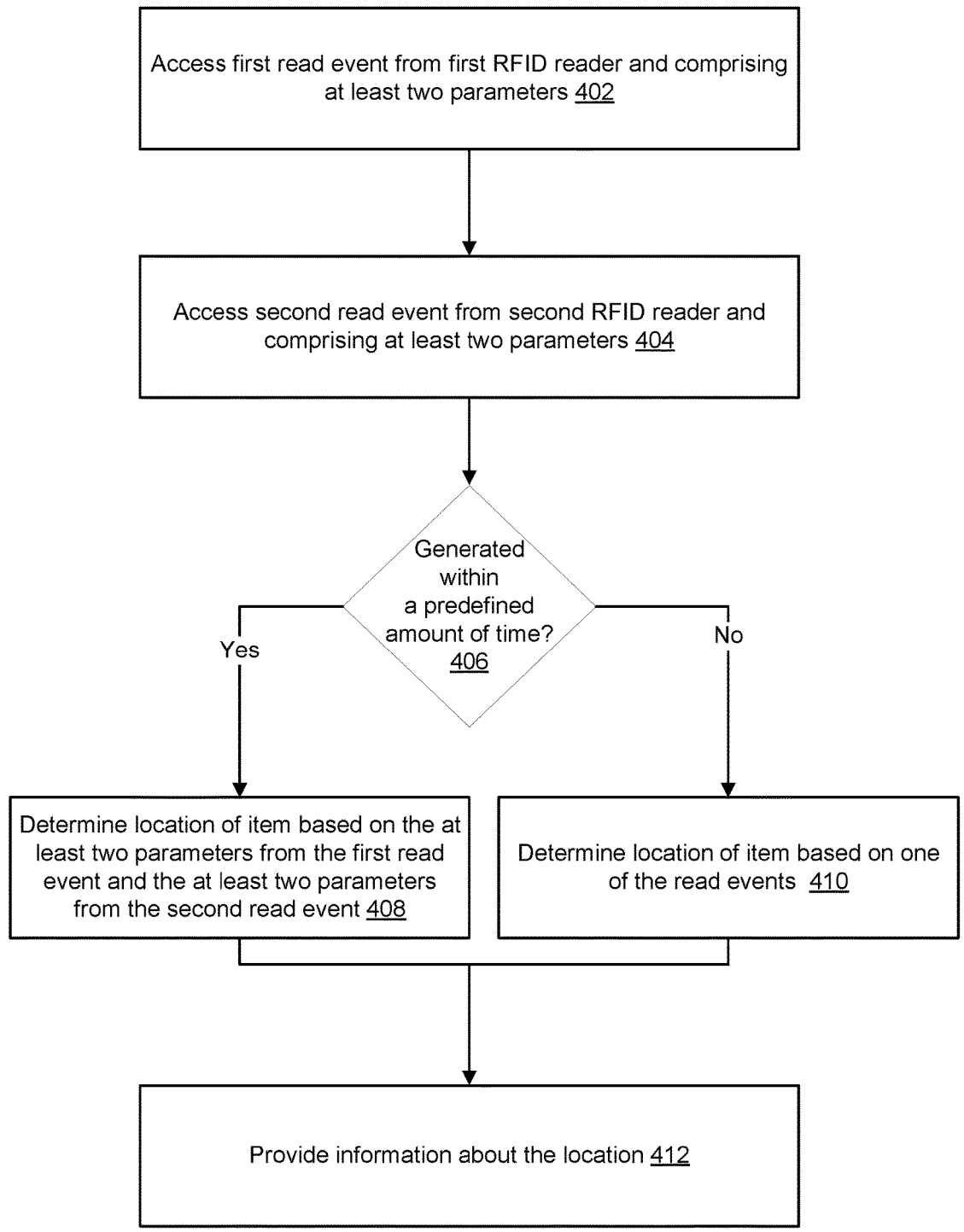
FIG. 4 illustrates an example flow for analyzing multiple read events and accordingly determining the closest RFID reader to an item, according to an embodiment of the present disclosure.
Figure 5:
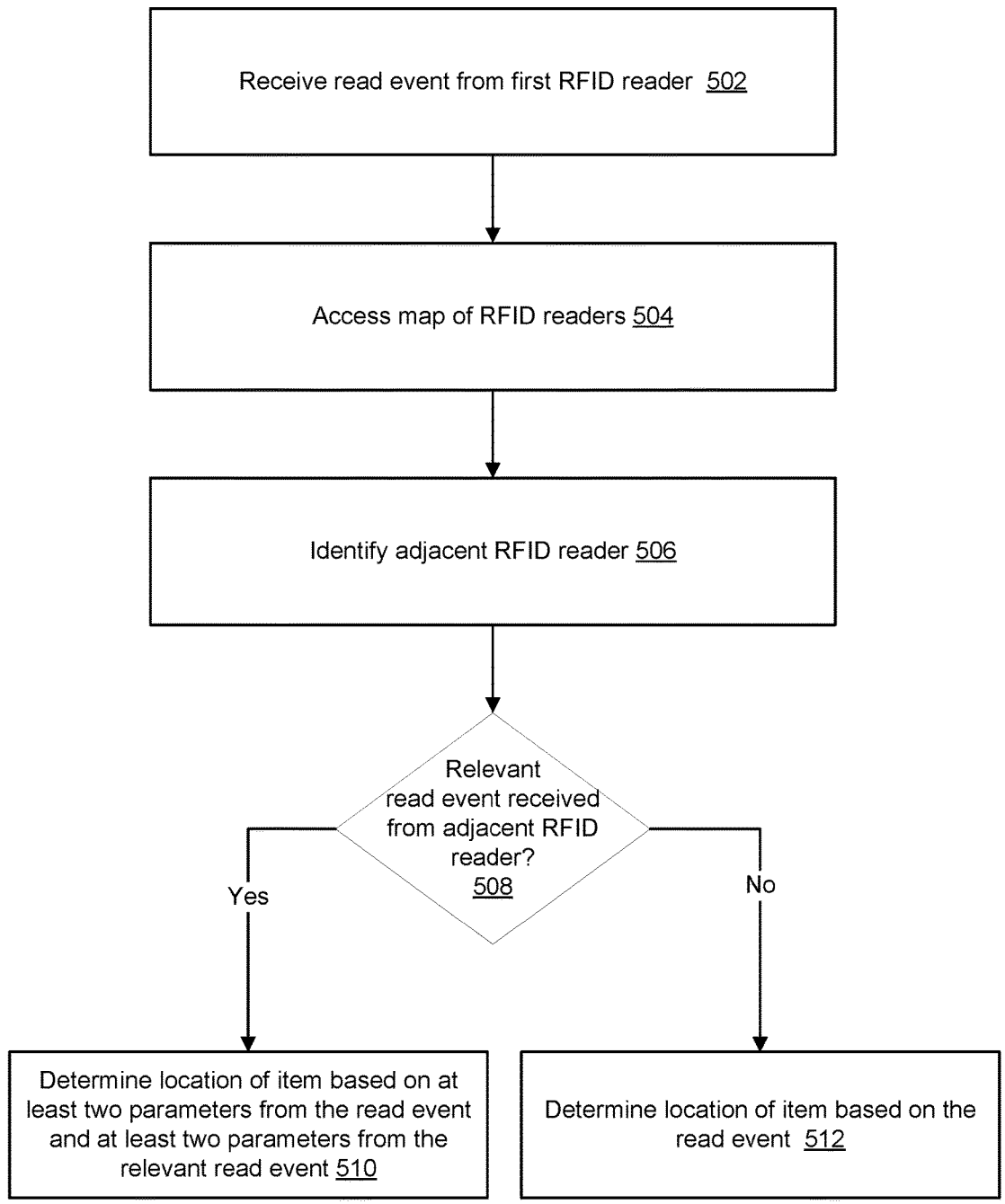
FIG. 5 illustrates another example flow for analyzing multiple read events based on a map of the RFID readers, according to an embodiment of the present disclosure.
Figure 6:
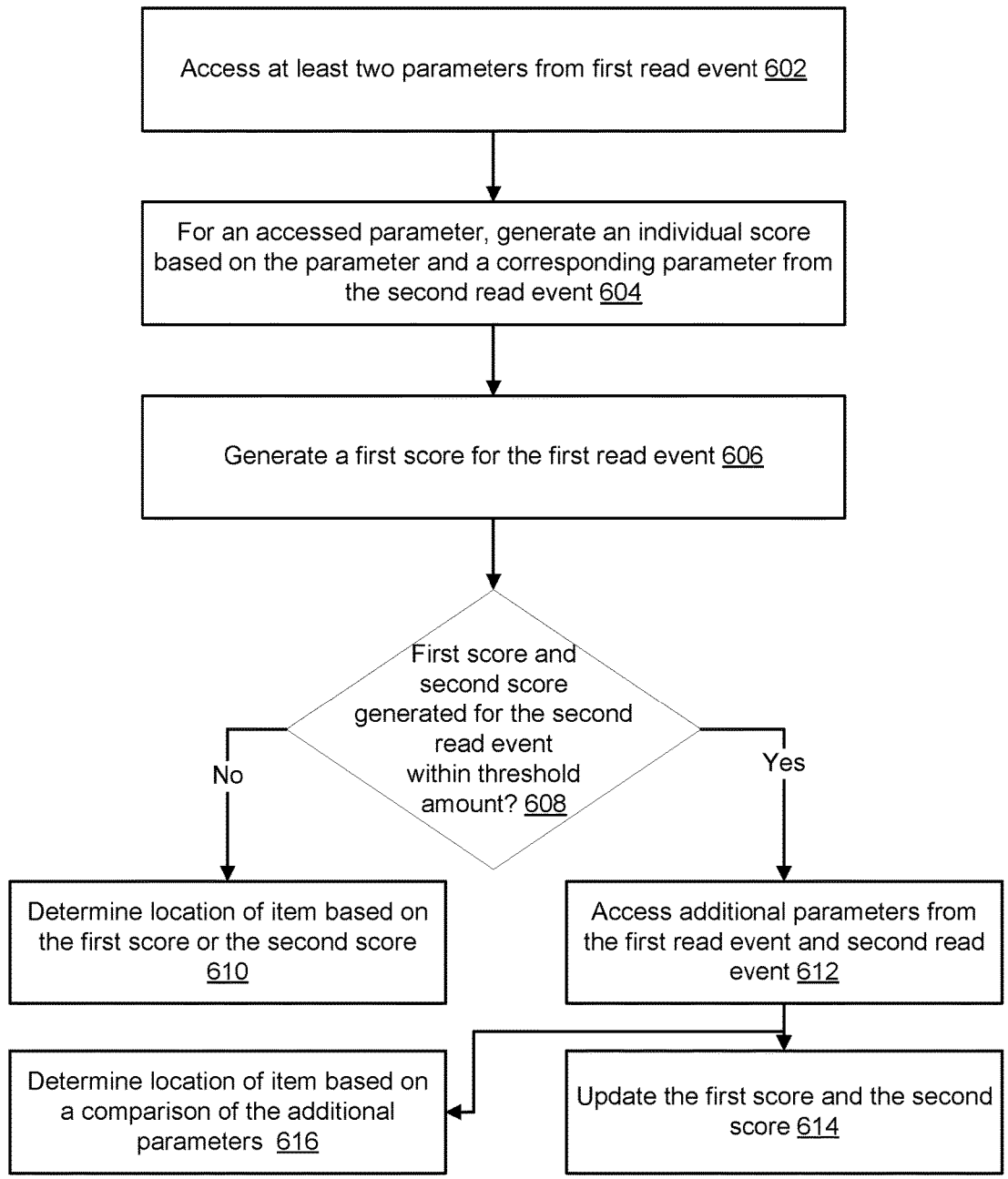
FIG. 6 illustrates an example statistical analysis of multiple parameters across multiple read events, according to an embodiment of the present disclosure.

Turning to FIGS. 4-6, the figures illustrate example flows for analyzing multiple read events to identify proximity of an item labeled with an RFID tag to RFID readers. A computer system is illustrated as performing operations of the example flows. In an example, the computer system may represent a back-end system hosting a tracking module (e.g., the back-end system 130 hosting the tracking module 132 of FIG. 1). Generally, the computer system may include a processor and a memory coupled to the processor. The processor may execute computer-readable instructions stored in the memory. The computer-readable instructions may include instructions for performing the operations.

In the interest of clarity of explanation, the analysis of read events of two RFID readers may be described in connection with the example flows. However, the example flows may similarly apply to a larger number of read events from two or a larger number of RFID readers. In particular, if a read event identifies the item and falls within a predefined time period of the analysis (e.g., overlaps with other read events being analyzed), the read event may be considered in the analysis. Accordingly, the relevant parameters from this read event are further analyzed.

Some of the operations of the example flows of FIGS. 4-6 may be similar. Such similarities are not repeated herein in the interest of clarity of explanation. Also, while the operations are illustrated in a particular order, it should be understood that no particular order is necessary and that one or more operations may be omitted, skipped, and/or reordered.

FIG. 4 illustrates an example flow for analyzing multiple read events and accordingly determining the closest RFID reader to the item. The example flow may start at operation 402, where the computer system may access a first read event of a first RFID reader. The first RFID reader may read the RFID tag during a first read cycle of the first RFID reader and accordingly generate the first read event. The first read event may include a number of first parameters, such as a first count of times the RFID tag was read, a first average signal strength, a first maximum signal strength, and a first set of time stamps. Multiple mechanisms may be possible to access the first read event. For example, the computer system may poll (e.g., send a request and receive a response) the first RFID reader and receive the first read event based on a polling cycle. In another example, a push mechanism may be implemented, where as soon as generated, the first RFID reader transmits the first read to the computer system. Under this approach, the first read event may be received in real time or substantially real time.

At operation 404, the computer system may access a second read event from a second RFID reader. The access may use a polling or a pushing mechanism. The second RFID reader may read the RFID tag during a second read cycle of the second RFID reader and accordingly generate the second read event. The second read event may include similar parameters, such as a second count of times the RFID tag was read, a second average signal strength, a second maximum signal strength, and a second set of time stamps.

At operation 406, the computer system may determine whether the read events were generated within a predefined amount of time from each other. In an example, the computer system may determine if an overlap between the first read cycle and the second read cycle exists. If the overlap exists, the computer system may determine that a cross-read of the RFID tag may exist. That may be the case because both RFID readers may have read the RFID tag, when only one should have. For instance, if each read cycle is five seconds long and there is an overlap of two seconds, then both RFID readers may have simultaneously read the RFID tag during these two seconds. In another example, the predefined amount of time may be set as a threshold time period. The threshold time period may be a function of the speed at which the item may be moving. The faster the speed may be, the smaller the threshold time period may be. In both examples, if the computer system determines that the first and second read events fall within the predefined amount of time, the computer system may determine that there is a cross-read. Accordingly, operation 408 may be performed to mitigate this risk by analyzing multiple parameters from each of the read events. Otherwise, operation 410 may be performed.

At operation 408, the computer system may determine a location of the item based on at least two parameters from the first event and at least two parameters from the second event. The location may be represent proximity to the closest RFID reader or the item moving through a zone covered by the RFID reader. The computer system may use a combination of any of the parameters (e.g., counts, average signal strengths, maximum signal strengths, time stamps) across the read events. Generally, the computer system may implement a statistical analysis. The statistical analysis may involve scoring each read event, where the score when compared to other scores may indicate a potential or a likelihood of the location of the item relative to the location and/or zone of the respective RFID reader. In an example, the statistical analysis may include a normalization to generate normalized scores, a summation to generate total scores per read event, a comparison of the total scores, and a comparison of last time stamps as illustrated in FIG. 3.

At operation 410, the computer system may determine the location of the item based on one of the read events. Because the read events may be generated at different times such that the risk of cross-read is low, the computer system may analyze the read events separately. The analysis may use one or more of the parameters. For instance, upon accessing the first read event, the computer system may use any of the first count, the first average signal strength, the first maximum signal strength, and/or the first set of time stamps to determine that during the first read cycle, the item may be closest to the first RFID reader. Similarly, upon accessing the second read event, the computer system may use any of the four parameters to determine that during the second read cycle, the item may be closest to the second RFID reader.

At operation 412, the computer system may provide information about the location of the item. For example, the computer system may drive a user interface of a client device. The user interface may present the location of the item in real time or substantially real time or a history of the location as the item moves between different zones.

FIG. 5 illustrates another example flow for analyzing multiple read events based on a map of the RFID readers. The example flow may start at operation 502, where the computer system may receive the first read event from the first RFID reader. In an example, the first read event may be received over a data communication network between the computer system and the first RFID reader.

At operation 504, the computer system may access the map of RFID readers. The map may be stored locally at or may be remotely available to the computer system. Accordingly, the computer system may retrieve the map from local memory or from a remote storage device. The map may identify and show the locations of the RFID readers and/or may show zones covered by the RFID readers.

At operation 506, the computer system may identify the second RFID reader based on the map and the first read event. For example, the first read event may identify (e.g., include a unique identifier of) the first RFID reader. The map may show RFID reader(s) that may be adjacent to the first RFID reader. The second RFID reader may be an adjacent RFID reader and may be accordingly identified.

At operation 508, the computer system may determine whether the second read event may be a relevant read event. A read event may be relevant when indicating a potential cross-read. Accordingly, the second read event may be relevant based on a number of factors. These factors may include the adjacency between the first RFID reader and the second RFID reader, an overlap between the respective zones, the first and second read events identifying the same item, and/or the first and second read events being generated within the predefined amount of time from each other. For instance, if the second read event identifies the item and was generated during a read cycle that overlaps with the read cycle of the first read event, the computer system may determine that the second read event is relevant. If so, operation 510 may be performed to analyze multiple parameters across the first and second read events and mitigate the risk of cross-read. Otherwise, operation 512 may be performed.

At operation 510, the computer system may determine the location of the item based on at least two parameters from the first event and at least two parameters from the second event. As described herein above, the computer system may implement a statistical analysis to generate scores. The scores may be compared to make the determination. A further example statistical analysis is illustrated in FIG. 6.

At operation 512, the computer system may determine the location of the item based on the first read event and independently of the second read event. That may be the case because at operation 506, the computer system may have determined that the second read event may not be relevant. Accordingly, the computer system may use any of the first count, the first average signal strength, the first maximum signal strength, and/or the first set of time stamps to determine that during the first read cycle, the item may be closest to the first RFID reader.

FIG. 6 illustrates an example statistical analysis of multiple parameters across multiple read events. The example flow may start at operation 602, where the computer system may access at least two parameters from the first read event. For example, the first count, the first average signal strength, and the first maximum signal strength may be accessed by parsing fields of the first read event.

At operation 604, the computer system may generate, for some or all of the accessed parameters, an individual score based on the parameters and the corresponding parameters from the second read event. An individual score for a first parameter from the first read event may be a normalized parameter given the first parameter and given the corresponding second parameter from the second read event. For instance, the individual score may be a normalized count, a normalized average signal strength, and/or a normalized maximum signal strength.

At operation 606, the computer system may generate a first score for the first read event. For example, the computer system may sum the individual scores generated at operation 604. In an example, the first score may represent the sum of the normalized count, the normalized average signal strength, and/or the normalized maximum signal strength.

At operation 608, the computer system may determine whether the first score and a second score generated for the second event fall within a threshold amount of each other. The second score may be similarly generated for the second read event based on the parameters of the second read event. The threshold amount may be a predefined deviation. If the difference between the two scores is too large (e.g., exceeding the threshold amount), operation 610 may be performed, where the computer system may rely on one of the two scores to make the location determination. Otherwise, operation 612 may be performed, where the computer system may rely on additional parameters to make the location determination.

At operation 610, the computer system may determine the location of the item based on the first score or the second score. For instance, the larger score of the two may be selected. The RFID reader having that score may be selected as being closest to the item.

At operation 612, the computer system may access additional parameters from the first read event and the second read event. In an example, the additional parameter may not have been considered in the analysis so far.

At operation 614, the computer system may update the first score and the second score based on the additional parameters. The update may involve performing operations 604-608 in light of the additional parameters. For example, if maximum signal strength may not have been analyzed, this parameter may be accessed from both read events. Each of the scores may be updated accordingly and compared.

At operation 616, the computer system may not update the first and second scores. Instead, the computer system may make the location determination based on a comparison of the additional parameters. For instance, the computer system may access time stamps from both events (e.g., the last time stamp from the first read event and the last time stamp from the second read event). The accessed time stamps may be compared to generate a timing order. The computer system may make the location determination based on the timing order (e.g., may select the RFID reader that has the latest time stamp).

Figure 7:
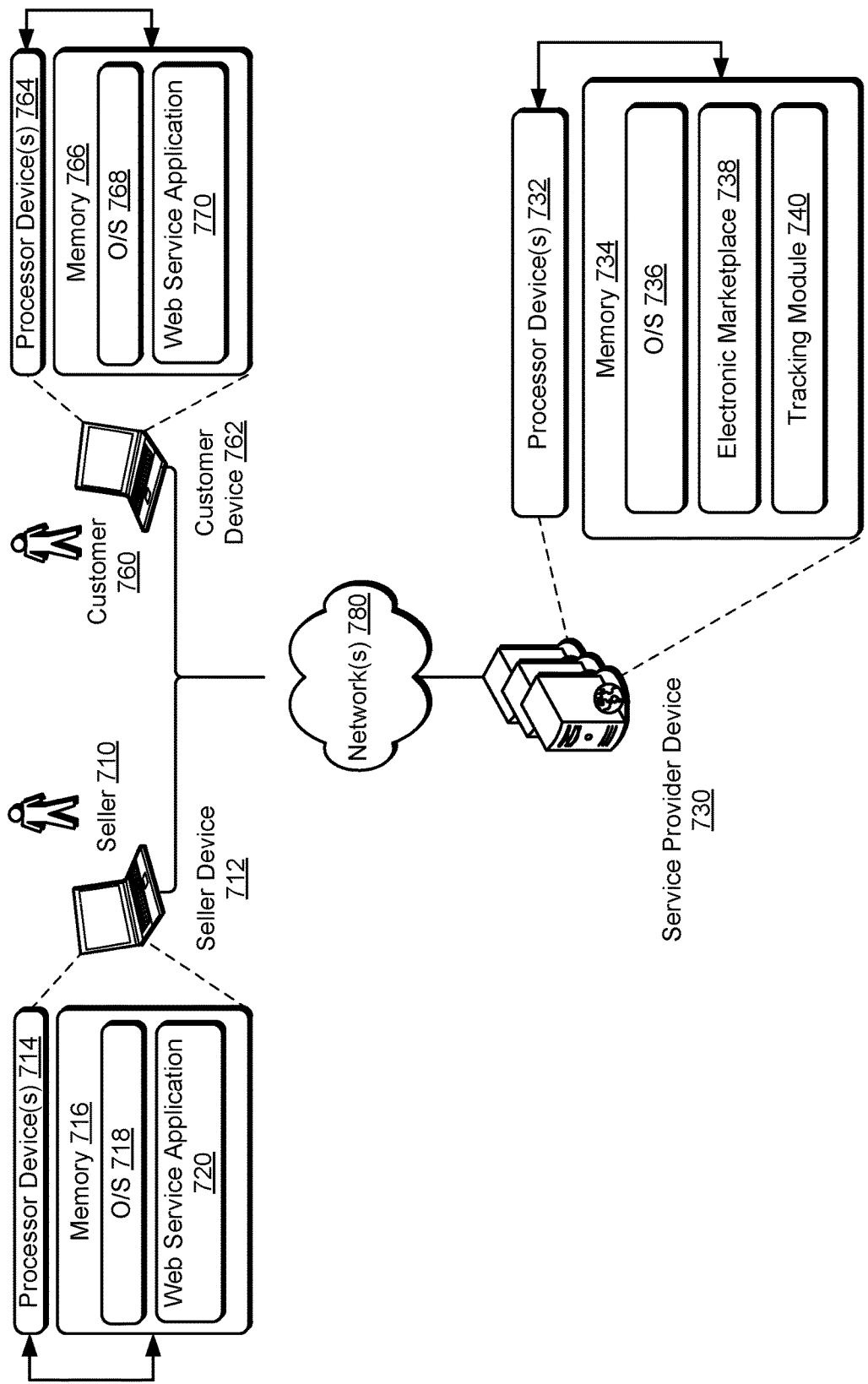
FIG. 7 illustrates example end-to-end architecture of a computing environment for processing RFID read events, according to an embodiment of the present disclosure.

FIG. 7 illustrates example end-to-end architecture of a computing environment for processing RFID read events. RFID read events may be generated by RFID readers and processed by a computer system. Such components may implement part of the computing environment to facilitate tracking of items in a sortation facility. The items may be available for purchase from an electronic marketplace associated with the sortation facility. The service provider may implement a tracking module to track the items. The items may be listed for offering by a seller 710 and/or the service provider and may be available for ordering by a customer 760.

In a basic configuration, the seller 710 may utilize a seller device 712 to access local applications, a web service application 720, a seller account accessible through the web service application 720, a web site or any other network-based resources via one or more networks 780. In some aspects, the web service application 720, the web site, and/or the seller account may be hosted, managed, and/or otherwise provided by one or more computing resources of the service provider, such as by utilizing one or more service provider devices 730. The seller 710 may use the local applications and/or the web service application 720 to interact with the network-based resources of the service provider and perform seller-related transactions. These transactions may include, for example, offering items for sale.

In some examples, the seller device 712 may be any type of computing devices such as, but not limited to, a mobile phone, a smart phone, a personal digital assistant (PDA), a laptop computer, a thin-client device, a tablet PC, etc. In one illustrative configuration, the seller device 712 may contain communications connection(s) that allow the seller device 712 to communicate with a stored database, another computing device or server, seller terminals, and/or other devices on the networks 780. The seller device 712 may also include input/output (I/O) device(s) and/or ports, such as for enabling connection with a keyboard, a mouse, a pen, a voice input device, a touch input device, a display, speakers, a printer, etc.

The seller device 712 may also include at least one or more processing units (or processor device(s)) 714 and at least one memory 716. The processor device(s) 714 may be implemented as appropriate in hardware, computer-executable instructions, firmware, or combinations thereof. Computer-executable instructions or firmware implementations of the processor device(s) 714 may include computer-executable or machine-executable instructions written in any suitable programming language to perform the various functions described.

The memory 716 may store program instructions that are loadable and executable on the processor device(s) 714, as well as data generated during the execution of these programs. Depending on the configuration and type of seller device 712, the memory 716 may be volatile (such as random access memory (RAM)) and/or non-volatile (such as read-only memory (ROM), flash memory, etc.). The seller device 712 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 716 may include multiple different types of memory, such as static random access memory (SRAM), dynamic random access memory (DRAM), or ROM.

Turning to the contents of the memory 716 in more detail, the memory may include an operating system (O/S) 718 and the one or more application programs or services for implementing the features disclosed herein including the web service application 720. In some examples, the seller device 712 may be in communication with the service provider devices 730 via the networks 780, or via other network connections. The networks 780 may include any one or a combination of many different types of networks, such as cable networks, the Internet, wireless networks, cellular networks, and other private and/or public networks. While the illustrated example represents the seller 710 accessing the web service application 720 over the networks 780, the described techniques may equally apply in instances where the seller 710 interacts with the service provider devices 730 via the seller device 712 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 760 may utilize customer device 762 to access local applications, a web service application 770 (or some other mobile application such as a "mobile app" available from an application store), a customer account accessible through the web service application 770, a web site, or any other network-based resources via the networks 780. In some aspects, the web service application 770, the web site, and/or the user account may be hosted, managed, and/or otherwise provided by the service provider devices 730 and may be similar to the web service application 720, the web site accessed by the computing device 712, and/or the seller account, respectively.

The customer 760 may use the local applications and/or the web service application 770 to conduct transactions with the network-based resources of the service provider. These transactions may include, for example, browsing for items, viewing items, ordering items, tracking shipping progress, and/or other transactions.

In some examples, the customer device 762 may be configured similarly to the seller device 712 and may include at least one or more processing units (or processor device(s)) 764 and at least one memory 766. The processor device(s) 764 may be implemented as appropriate in hardware, computer-executable instructions, firmware, or combinations thereof similarly to the processor device(s) 714. Likewise, the memory 766 may also be configured similarly to the memory 716 and may store program instructions that are loadable and executable on the processor device(s) 764, as well as data generated during the execution of these programs. For example, the memory 766 may include an operating system (O/S) 768 and the one or more application programs or services for implementing the features disclosed herein including the web service application 770.

As described briefly above, the web service applications 720 and 770 may allow the seller 710 and customer 760, respectively, to interact with the service provider devices 730 to conduct transactions involving items. The service provider devices 730, perhaps arranged in a cluster of servers or as a server farm, may host the web service applications 720 and 770. These servers may be configured to host a web site (or combination of web sites) viewable via the computing devices 712 and 762. Other server architectures may also be used to host the web service applications 720 and 770. The web service applications 720 and 770 may be capable of handling requests from many sellers 710 and customers 760, respectively, and serving, in response, various interfaces that may be rendered at the computing devices 712 and 762 such as, but not limited to, a web site. The web service applications 720 and 770 may interact with any type of web site that supports interaction, including social networking sites, electronic retailers, informational sites, blog sites, search engine sites, news and entertainment sites, and so forth. As discussed above, the described techniques may similarly be implemented outside of the web service applications 720 and 770, such as with other applications running on the computing devices 712 and 762, respectively.

The service provider devices 730 may, in some examples, provide network-based resources such as, but not limited to, applications for purchase and/or download, web sites, web hosting, client entities, data storage, data access, management, virtualization, etc. The service provider devices 730 may also be operable to provide web hosting, computer application development, and/or implementation platforms, or combinations of the foregoing to the seller 710 and customer 760.

The service provider devices 730 may be any type of computing device such as, but not limited to, a mobile phone, a smart phone, a personal digital assistant (PDA), a laptop computer, a desktop computer, a server computer, a thin-client device, a tablet PC, etc. The service provider devices 730 may also contain communications connection(s) that allow service provider devices 730 to communicate with a stored database, other computing devices or servers, seller terminals, and/or other devices on the network 780. The service provider devices 730 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 730 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 730 may be in communication with the computing devices 712 and 762 via the networks 780, or via other network connections. The service provider devices 730 may include one or more servers, perhaps arranged in a cluster, or as individual servers not associated with one another.

In one illustrative configuration, the service provider devices 730 may include at least one or more processing units (or processor devices(s)) 732 and at least one memory 734. The processor device(s) 732 may be implemented as appropriate in hardware, computer-executable instructions, firmware, or combinations thereof. Computer-executable instruction or firmware implementations of the processor device(s) 732 may include computer-executable or machine-executable instructions written in any suitable programming language to perform the various functions described.

The memory 734 may store program instructions that are loadable and executable on the processor device(s) 732, as well as data generated during the execution of these programs. Depending on the configuration and type of the service provider devices 730, the memory 734 may be volatile (such as random access memory (RAM)) and/or non-volatile (such as read-only memory (ROM), flash memory, etc.). The service provider devices 730 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 734 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 734 in more detail, the memory may include an operating system (O/S) 736, code for an electronic marketplace 738 and code for a tracking module 740. The tracking module 740 may be configured to track items based on RFID read events and provide information about the tracking via interfaces to the service provider, the seller device 712, and the customer device 762.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a first radio frequency identification (RFID) reader located within a first zone and configured to generate a first read event based at least in part on one or more first reads of an RFID tag during a first read cycle of the first RFID reader, the RFID tag attached to an item having a variable location over time, the first read event identifying the RFID tag and comprising first RFID parameters, the first RFID parameters comprising a first count of times the RFID tag was read, a first average signal strength, a first maximum signal strength, and a first set of time stamps;
a second RFID reader located within a second zone and configured to generate a second read event based at least in part on one or more second reads of the RFID tag during a second read cycle of the second RFID reader, the second read event identifying the RFID tag and comprising second RFID parameters, the second RFID parameters comprising a second count of times the RFID tag was read, a second average signal strength, a second maximum signal strength, and a second set of time stamps;
a processor; and
a memory comprising computer-readable instructions that, upon execution by the processor, cause the computer system to at least:
receive the first read event from the first RFID reader and the second read event from the second RFID reader;
determine whether a time overlap exists between the first read event and the second read event based at least in part on the first read cycle and the second read cycle;
based at least in part on determining that the time overlap exists, store an association between the item and one of the first zone or the second zone based at least in part on two or more first RFID parameters from the first read event and two or more second RFID parameters from the second read event; and
provide an indication of the association to a device for presentation at the device.

2. The system of claim 1, wherein the computer-readable instructions cause the computer to store the association between the item and one of the first zone or the second zone by acts that include:
generating a total count based at least in part on the first count and the second count;
generating a total average signal strength based at least in part on the first average signal strength and the second average signal strength;
generating a total maximum signal strength based at least in part on the first maximum signal strength and the second maximum signal strength;
for each of the first read event and the second read event, generating a score based at least in part on the total count, the total average signal strength, and the total maximum signal strength; and
determining whether the item is located within the first zone or the second zone based at least in part on a comparison of the score of the first read event and the score of the second read event.

3. The system of claim 2, wherein the computer-readable instructions cause the computer to determine whether the item was located within the first zone or the second zone by acts that include:
determining that the scores of the first read event and the second read event are within a threshold amount from each other based at least in part on the comparison;
comparing a first time stamp from the first set of time stamps and a second time stamp from the second set of time stamps based at least in part on the scores being within the threshold amount;

determining a timing order between the first time stamp and the second time stamp; and determining whether the item is located within the first zone or the second zone based at least in part on the timing order.

4. The system of claim 1, wherein the first zone and the second zone are located within a sortation facility, wherein the variable location varies with movement of the item within the sortation facility, and the instructions further cause the computer system to at least identify, at a user interface, the first zone and the second zone relative to the sortation facility and the association between the item and the one of the first zone or the second zone.

5. A computer-implemented method comprising:

accessing, by a computer system, a first read event generated by a first radio frequency identification (RFID) reader located within a first zone, the first read event identifying an RFID tag associated with an item and comprising first RFID parameters, and generated at a first time;

accessing, by the computer system, a second read event generated by a second RFID reader located within a second zone, the second read event identifying the RFID tag and comprising second RFID parameters, and generated at a second time, the first time and the second time being within a predefined amount of time of each other; and storing, by the computer system, an association between a location of the item and one of the first zone or the second zone based at least in part on two or more first RFID parameters from the first read event and two or more second RFID parameters from the second read event.

6. The computer-implemented method of claim 5, further comprising presenting, at a user interface, the location of the item within a sortation facility within which the first RFID reader and the second RFID reader are located; and generating each read event during a read cycle, wherein the first RFID parameters and the second RFID parameters each comprise a count of times the RFID tag was read, an average signal strength, a maximum signal strength, and a set of time stamps, wherein the predefined amount of time represents a time overlap between the first read event and the second read event.

7. The computer-implemented method of claim 5, wherein storing the association between the location of the item and the one of the first zone or the second zone comprises determining whether the location of the item falls within the first zone or the second zone based at least in part on a normalization of the two or more first RFID parameters from the first read event and the two or more second RFID parameters from the second read event.

8. The computer-implemented method of claim 5, wherein storing the association between the location of the item and the one of the first zone or the second zone comprises:

generating a first score for the first read event based at least in part on the two or more first RFID parameters from the first read event and the two or more second RFID parameters from the second read event; and determining whether the location of the item falls within the first zone or the second zone based at least in part on a comparison of the first score generated for the first read event to a second score generated for the second read event.

9. The computer-implemented method of claim 8, wherein generating the first score comprises:

for each of the two or more first RFID parameters from the first read event, generating an individual score based at least in part on a respective one of the first RFID parameters from the first read event and a corresponding one of the second RFID parameters from the second read event; and generating the first score based at least in part on the individual scores of the two or more first RFID parameters from the first read event.

10. The computer-implemented method of claim 8, wherein generating the first score comprises:

generating, from the first read event and the second read event, a total count of times the RFID tag was read, an average signal strength, and a maximum signal strength.

11. The computer-implemented method of claim 10, wherein generating the first score comprises:

dividing a first count of times the RFID tag was read from the first read event by the total count to generate a normalized count;

dividing a first average signal strength from the first read event by the average signal strength to generate a normalized average signal strength;

dividing a first maximum signal strength from the first read event by the maximum signal strength to generate a normalized maximum signal strength; and summing the normalized count, the normalized average signal strength, and the normalized maximum signal strength to generate the first score.

12. The computer-implemented method of claim 11, wherein determining whether the location of the item falls within the first zone or the second zone comprises determining that the location of the item falls within the first zone based at least in part on a determination that the first score is greater than the second score.

13. The computer-implemented method of claim 12, wherein, based at least in part on a comparison indicating that a difference between the first score and the second score is within a threshold amount, comparing a last time stamp from the first read event to a last time stamp from the second read event.

14. The computer-implemented method of claim 13, wherein determining whether the location of the item falls within the first zone or the second zone comprises determining that the location of the item falls within the first zone based at least in part on the last time stamp from the first read event being more recent than the last time stamp from the second read event.

15. The computer-implemented method of claim 5, further comprising:

accessing, by the computer system, a third read event generated by a third RFID reader located within a third zone, the third read event identifying the RFID tag and comprising third RFID parameters, and storing, by the computer system, an association between the location of the item and the third zone based at least in part on two or more third RFID parameters from the third read event.

16. One or more computer-readable storage media comprising instructions that, upon execution by a processor, cause a system to perform operations comprising:

accessing a first read event generated by a first radio frequency identification (RFID) reader located within a first zone, the first read event identifying an RFID tag associated with an item and comprising first RFID parameters, the first RFID parameters comprising a first count of times the RFID tag was read, a first average signal strength, a first maximum signal strength, and a first set of time stamps;

accessing a second read event generated by a second RFID reader located within a second zone, the second read event identifying the RFID tag and comprising second RFID parameters, the second RFID parameters comprising a second count of times the RFID tag was read, a second average signal strength, a second maximum signal strength, and a second set of time stamps;

determining whether a time overlap exists between the first read event and the second read event; and based at least in part on determining that the time overlap exists, storing an association between the item and one of the first zone or the second zone based at least in part on two or more first RFID parameters from the first read event and two or more second RFID parameters from the second read event.

17. The system of claim 16, wherein the one or more computer-readable storage media comprising instructions that, upon execution by a processor, cause the system to receive the first read event and the second read event from the first RFID reader and the second RFID reader, respectively, at least in part via a push communication mechanism.

18. The system of claim 16, wherein the one or more computer-readable storage media comprising instructions that, upon execution by a processor, cause the system to access the first read event and the second read event at least in part via a mapping of RFID readers to respective locations, wherein the mapping indicates that the first RFID reader is located within the first zone, the second RFID reader is located within the second zone, and the first zone and the second zone are adjacent.

19. The system of claim 18, wherein accessing the first read event comprises receiving the first read event from the first RFID reader, and wherein the operations further comprise:

determining that the second zone is adjacent to the first zone based at least in part on the mapping; and accessing the second read event based at least in part on the first read event being received and the second zone being adjacent to the first zone.

20. The system of claim 16, wherein the one or more computer-readable storage media comprising instructions that, upon execution by a processor, cause the system to access the first read event and the second read event in real time, and wherein storing the association comprises determining in real time whether the item is located in the first zone or the second zone, and wherein the operations further comprise presenting a location of the item at a user interface in real time.

* * * * *